United States Patent
Bardill et al.

(10) Patent No.: US 7,438,267 B2
(45) Date of Patent: Oct. 21, 2008

(54) PAINT BUCKET LADDER HOOK WITH CLOSED GRIP DESIGN HANDLE

(75) Inventors: Stephen Albert Bardill, Sterling Heights, MI (US); Vito Monteleone, 2528 Lorenzo, Sterling Heights, MI (US) 48314

(73) Assignees: Stephen A. Bardill, Sterling Heights, MI (US); Vito Monteleone, Sterling Heights, MI (US)

( * ) Notice: Subject to any disclaimer, the term of this patent is extended or adjusted under 35 U.S.C. 154(b) by 64 days.

(21) Appl. No.: 11/435,608

(22) Filed: May 17, 2006

(65) Prior Publication Data

US 2007/0272814 A1    Nov. 29, 2007

(51) Int. Cl.
*E06C 7/14* (2006.01)
(52) U.S. Cl. ..................... 248/210; 248/303
(58) Field of Classification Search ............. 248/210, 248/211, 113, 303; 211/113, 119; 182/206; D8/373, 367; 47/67
See application file for complete search history.

(56) References Cited

U.S. PATENT DOCUMENTS

| | | | | |
|---|---|---|---|---|
| 70,884 A | * | 11/1867 | Oatley | 248/340 |
| 443,981 A | * | 12/1890 | Braren | 160/390 |
| 873,488 A | * | 12/1907 | De Beaumont et al. | 211/119.1 |
| 2,519,980 A | * | 8/1950 | Renz | 248/211 |
| 2,747,825 A | * | 5/1956 | Lachenmayer | 248/210 |
| 2,929,886 A | * | 3/1960 | Marback | 379/450 |
| 3,285,482 A | * | 11/1966 | Bedsaul, Sr. | 224/268 |
| 4,188,719 A | * | 2/1980 | Hoff | 30/122 |
| 5,062,607 A | | 11/1991 | Kisner | |
| 5,224,607 A | * | 7/1993 | Koresko | 211/34 |
| 5,276,943 A | | 1/1994 | Ludy | |
| 5,356,061 A | * | 10/1994 | Yu | 224/275 |
| D360,533 S | * | 7/1995 | Williams | D6/315 |
| D393,413 S | | 4/1998 | Brown | |
| 5,797,571 A | | 8/1998 | Brophy | |
| D405,965 S | * | 2/1999 | Cardenas | D6/328 |
| 6,279,797 B1 | * | 8/2001 | Snyder | 224/268 |
| 7,081,071 B2 | * | 7/2006 | Smith | 482/105 |

* cited by examiner

*Primary Examiner*—Korie H. Chan
(74) *Attorney, Agent, or Firm*—Stephen Bardill; Vito Monteleone

(57) ABSTRACT

A ladder rung hook (122) and upper horizontal frame (124) intersect to create an embodiment for a gripping vertical handle (126). This handle makes it faster, safer, and easy for a user to move a can of paint from rung to rung on an extension ladder. Left or right-handed painters can maneuver their can of paint with our unique easy to grip handle. A lower spring snap hook (138) will easily hook to a can of paint. The ladder hook (122) will simply be hung to the ladder rung through the easy to grip handle.

1 Claim, 7 Drawing Sheets

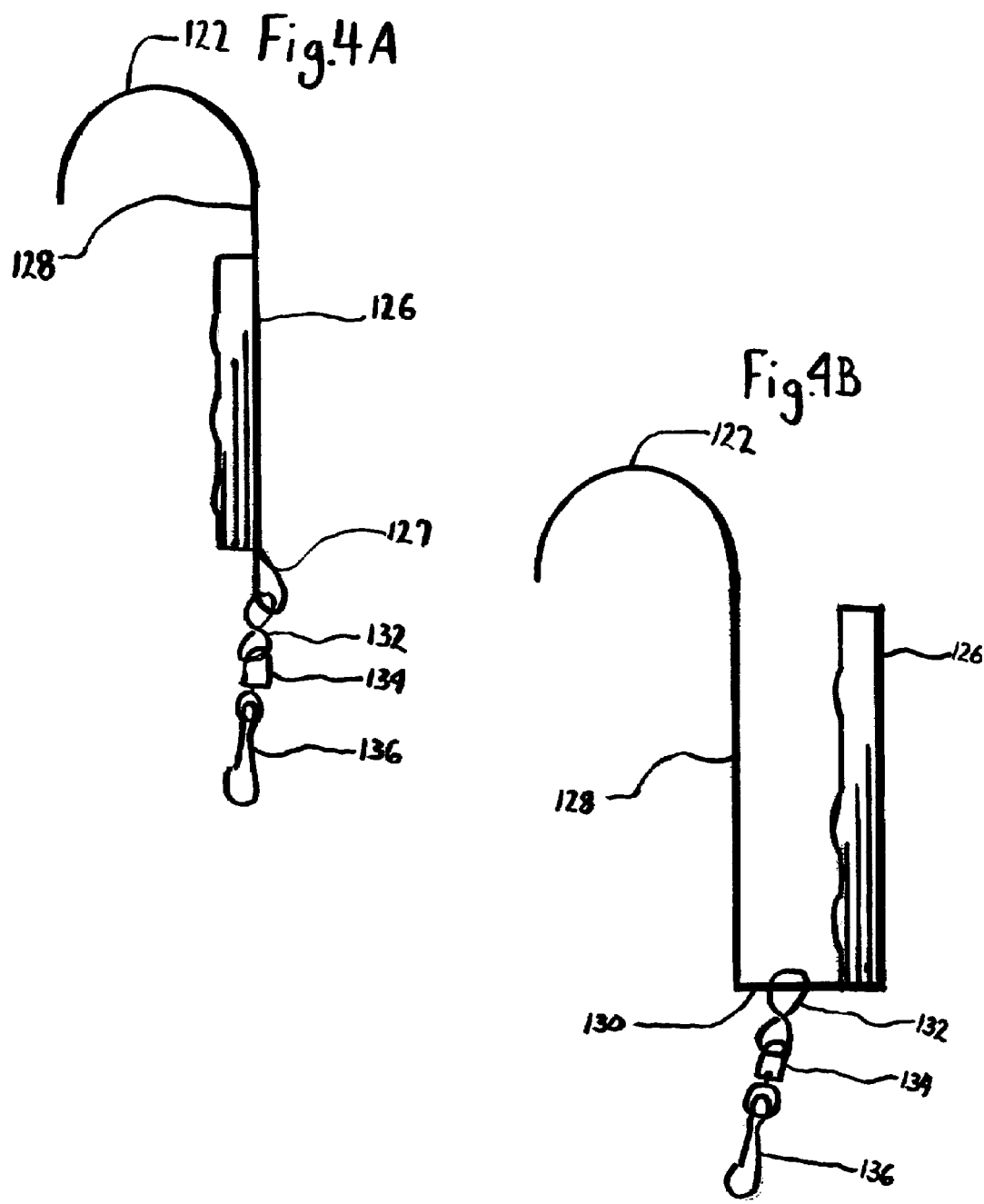

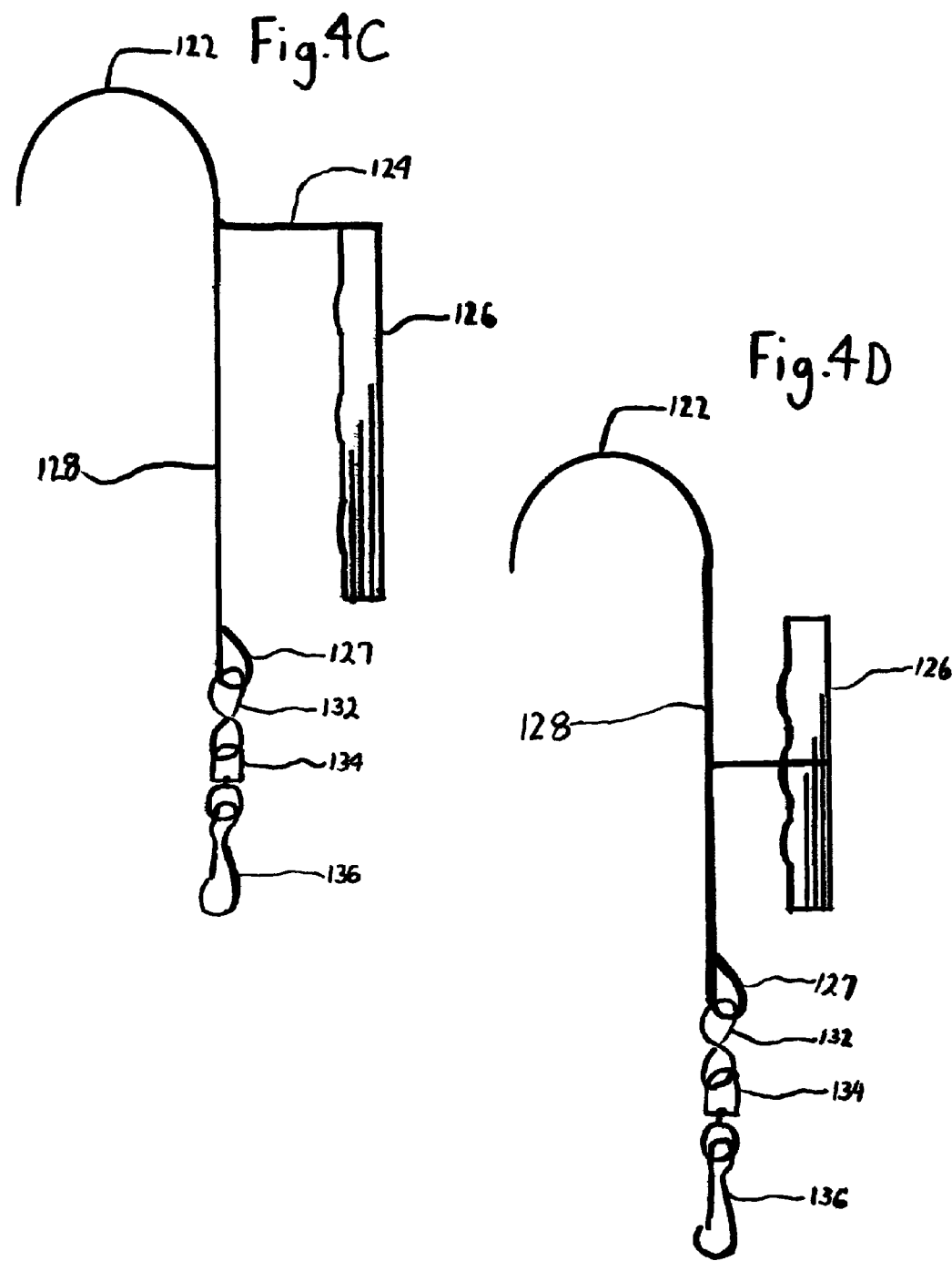

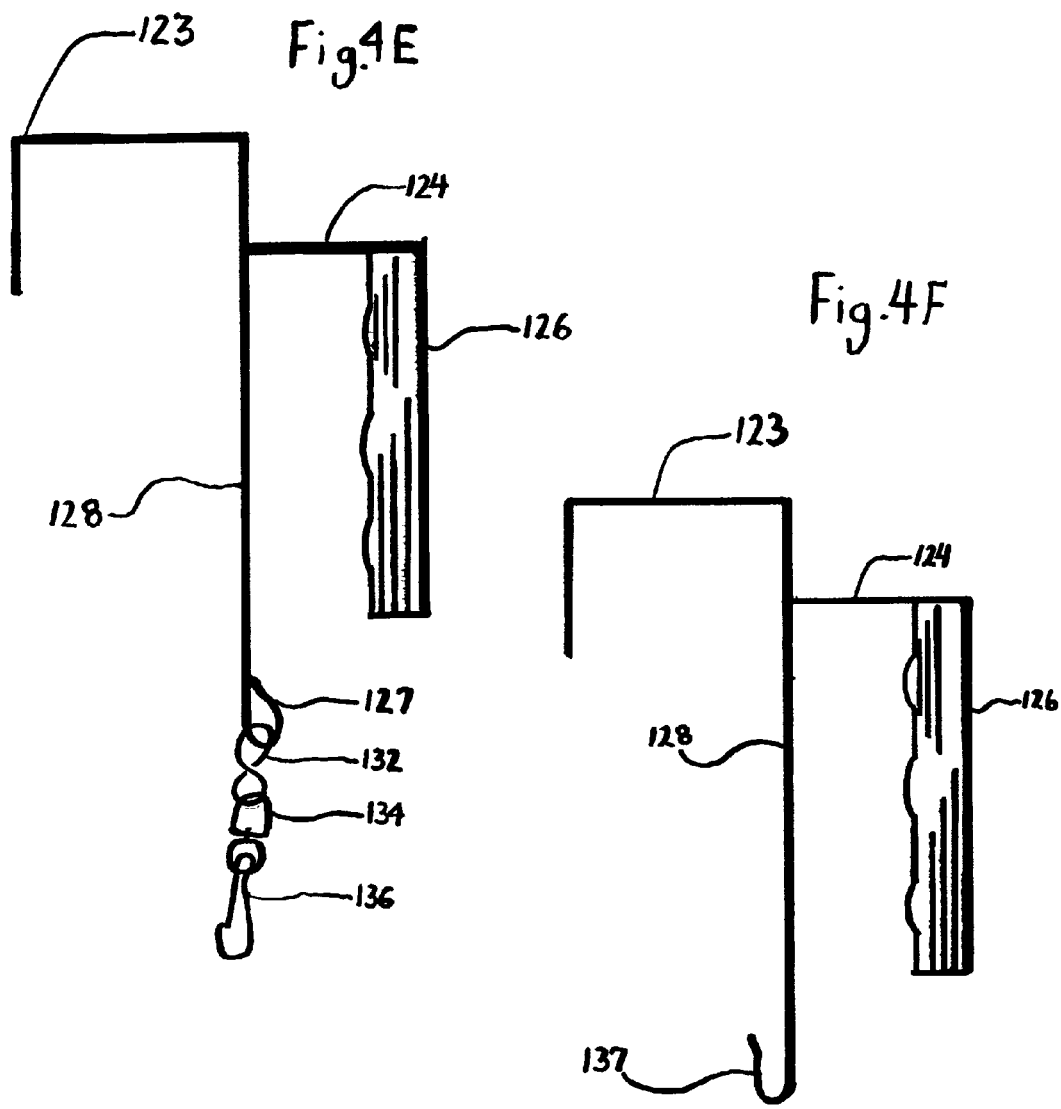

PAINT BUCKET LADDER HOOK WITH CLOSED GRIP DESIGN HANDLE

CROSS-REFERENCE TO RELATED APPLICATIONS

Not Applicable

FEDERALLY SPONSORED RESEARCH

Not Applicable

SEQUENCE LISTING OR PROGRAM

Not Applicable

BACKGROUND OF THE INVENTION

1. Field of Invention

This invention relates to a paint bucket hook for attaching a can of paint securely to an extension ladder.

2. Prior Art

Our invention is for homeowners or professional painters who want to paint the interior or exterior of their building or project. For the longest time there has not been a faster, safer, and easier way to maneuver a can of paint from rung to rung on an extension ladder. Our invention solves this problem. Our findings have concluded that the related prior art inventions were much to complicated, and took to much time to maneuver the can of paint from rung to rung on an extension ladder. This lagging time factor makes their inventions unsafe for the painter who may be at high elevation on the extension ladder. Furthermore, these other similar inventions are cumbersome. Prior art displayed various types of paint bucket hooks and holders for attaching or mounting a can of paint to a ladder. Unfortunately, these designs did not have an easy to grip built in handle to improve better agility to the gripping action of the paint bucket ladder hook. Furthermore, some of the other similar inventions were not designed for left or right-handed painters; they were made for right-handed painters only. Various paint bucket hooks and holders for attaching a can of paint to a ladder do exist.

U.S. Pat. No. 5,062,607 to Kisner (1991) discloses a paint can holder for detachably mounting a receptacle such as a paint can to a ladder. However, this invention does not have the easy to grip built in handle for quick and agile maneuverability. Furthermore, this will cause the painter to have difficulty moving the can of paint from rung to rung on an extension ladder. This defect will slow down the painter's production.

U.S. Pat. No. 5,276,943 to Ludy (1994) a handle for a paint can suspends the can securely from a ladder rung in a stationary mode. Unfortunately, this invention does not have the easy to grip built in handle, for fast and easy paint can movement from rung to rung on an extension ladder. This problem will hinder the painter's performance and efficiency by its stationary design.

U.S. Pat. No. 393,413 to Brown (1998) an ornamental design paint bucket hook for a ladder does not have the easy to grip built in handle for faster, safer, and easier maneuverability. Therefore, getting the paint can from rung to rung on an extension ladder will be slow and difficult for most painters. Some painters may need to use two hands to disengage the hook from the rung of the ladder, which will create a dangerous situation; there by meaning the painter will not be holding onto the ladder at all for an undetermined amount of time.

U.S. Pat. No. 5,797,571 to Brophy (1998) has a combined ladder hook and bracket assembly for holding a can of paint to a ladder. Unfortunately, this invention is made for right-handed painters only. You will see that in this inventor's drawing a right side rung mounting system consisting of a closed loop eyelet and swivel hook built into the adjustable arm for right hand painting. Furthermore, you will notice the open loop on the left side of the arm. This open loop is simply a stop, to prevent the arm from sliding out of the brackets. I would like to add, there is not a built in easy to grip handle; to move the can of paint from rung to rung on the ladder. Moreover, without the easy to grip handle on this design the invention will be slow while trying to move the can of paint from rung to rung on the ladder. Furthermore, this lagging time makes this invention unsafe because the painter may be very high up on the ladder.

OBJECTS AND ADVANTAGES

Several objects and advantages of the present invention are:

(a) To provide a paint bucket ladder hook with closed grip design handle.
(b) To provide a paint bucket ladder hook for a ladder, for right and left-handed painters.
(c) To provide a faster way for the painter to move the can of paint from rung to rung on an extension ladder, as a single unit while the paint can is securely attached to the ladder hook. This includes moving the can of paint vertical up and vertical down the rung of the extension ladder.
(d) To provide a safer and easier way for the painter to maneuver the paint can from horizontal left on the rung of the extension ladder, to horizontal right on the rung of the extension ladder.
(e) To provide an easy to grip handle so the painter can move the can of paint from rung to rung on an extension ladder using only one hand.
(f) To provide a strong, secure hook and handle.
(g) To provide a simple lightweight design for greater maneuverability.
(h) To provide convenient paint can access so the painter can improve production.

Further objects and advantages of the invention will become apparent from a consideration of the drawings and ensuing description.

SUMMARY

In accordance with the present invention the primary object is to provide painters a fast and safe way to move the can of paint from rung to rung on an extension ladder. This task can be accomplished by using our paint bucket ladder hook with closed grip design handle. The painter simply attaches the paint bucket to the bottom of the spring snap hook then grips the handle and attaches the can of paint securely to the rung of the ladder, through means of the top hook.

DRAWINGS—FIGURES

Figure 1:
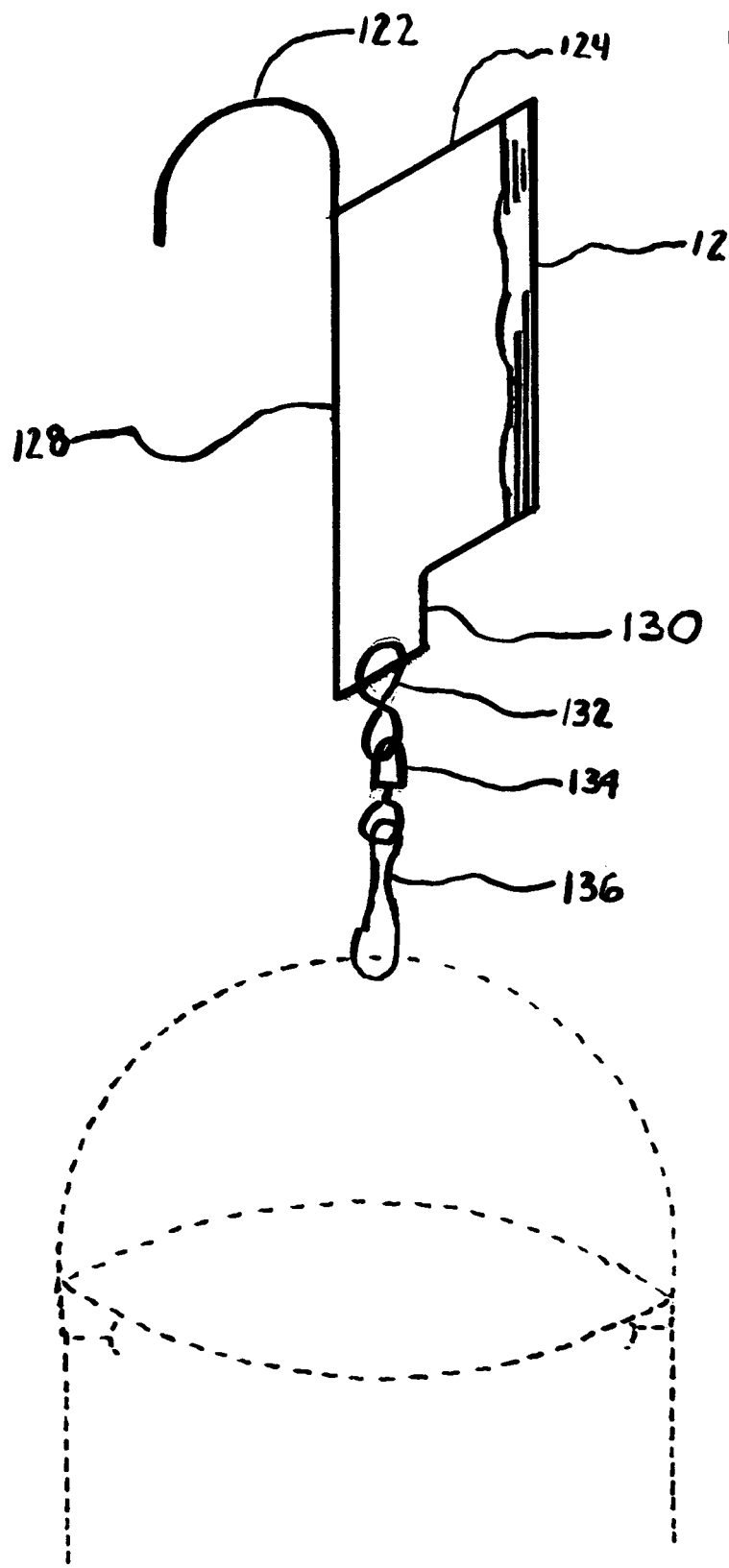
FIG. 1 is an isometric view of the paint bucket ladder hook with closed rectangular grip design handle.
Figure 2:
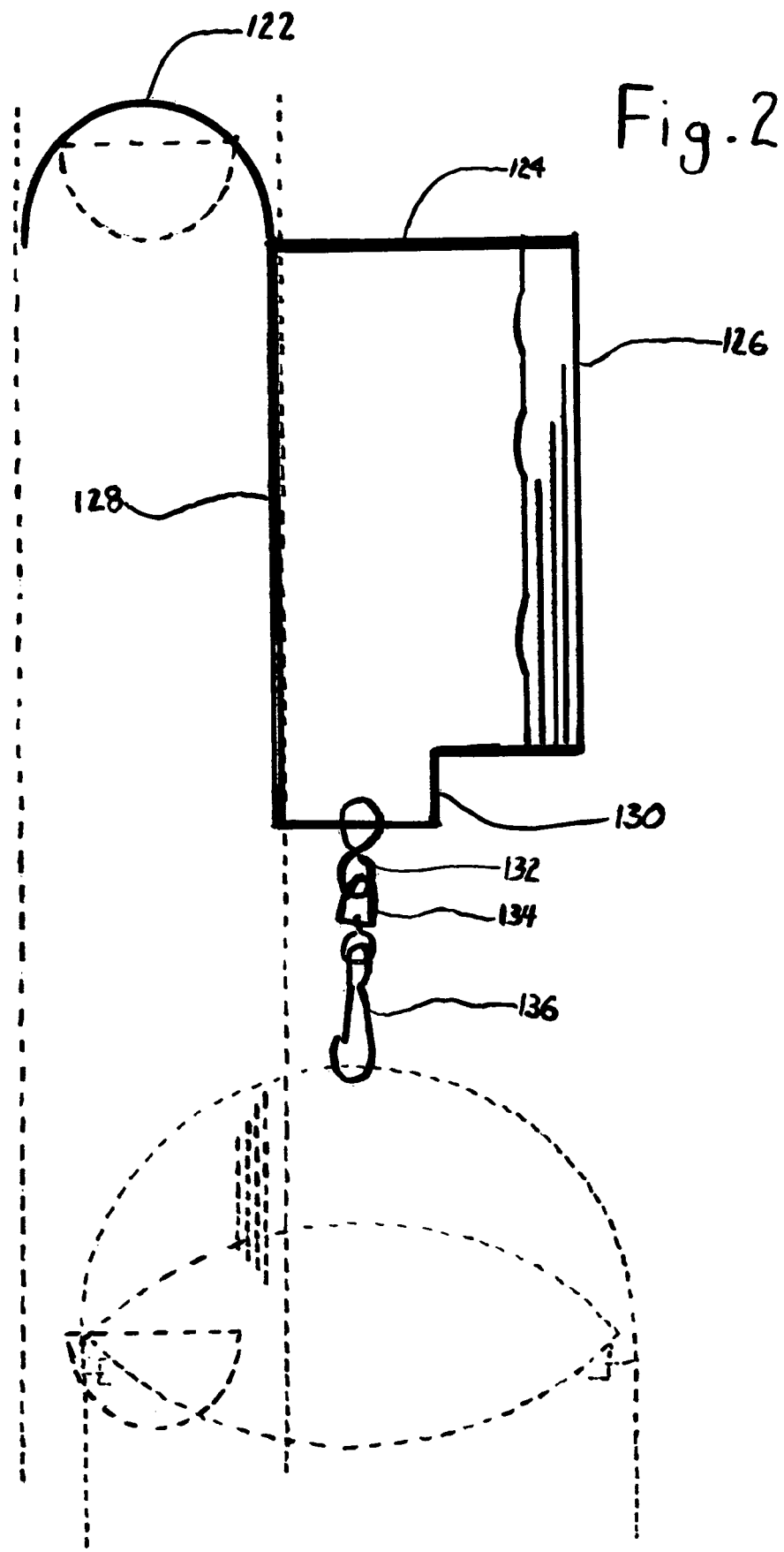
FIG. 2 is a left side view of the paint bucket ladder hook securely attached to an extension ladder rung, with the can of paint securely attached to the spring snap hook.

The broken line showing the paint bucket in FIG. 1 and FIG. 2 are for illustrative purposes only and forms no part of the claimed design. Moreover, the broken line in FIG. 2 showing the side of the extension ladder rail and rung are for illustrative purposes only.

DRAWINGS—REFERENCE NUMERALS 122 rounded extension ladder rung hook
123 rectangular extension ladder rung hook
124 upper horizontal frame
126 closed rectangular grip handle
128 vertical frame
130 lower frame
132 S-hook
134 swivel
136 spring snap hook
137 solid one-piece lower hook

DETAILED DESCRIPTION—PREFERRED EMBODIMENT

Referring to the drawings and especially FIG. 1, a paint bucket extension ladder hook with closed rectangular grip design handle; for moving the paint can quickly from rung to rung on an extension ladder. Constructed in accordance with the invention a strong metal is formed in the shape of a hook with a built in handle. FIG. 1 shown has a rounded extension ladder rung hook 122 connected to the upper horizontal frame 124. Upper horizontal frame 124 also connects to the upper end of the closed rectangular grip handle 126. Closed rectangular grip handle 126 then connects to lower horizontal frame 130; lower horizontal frame 130 then connects to vertical frame 128. S-hook 132 connects to lower frame 130; swivel 134 connects to S-hook 132 and spring snap hook 136 connects to swivel 134.

As shown in FIG. 1 the drawing with broken lines is a depiction of the can of paint securely attached to the spring snap hook 136.

OPERATION—PREFERRED EMBODIMENT

Figure 3:
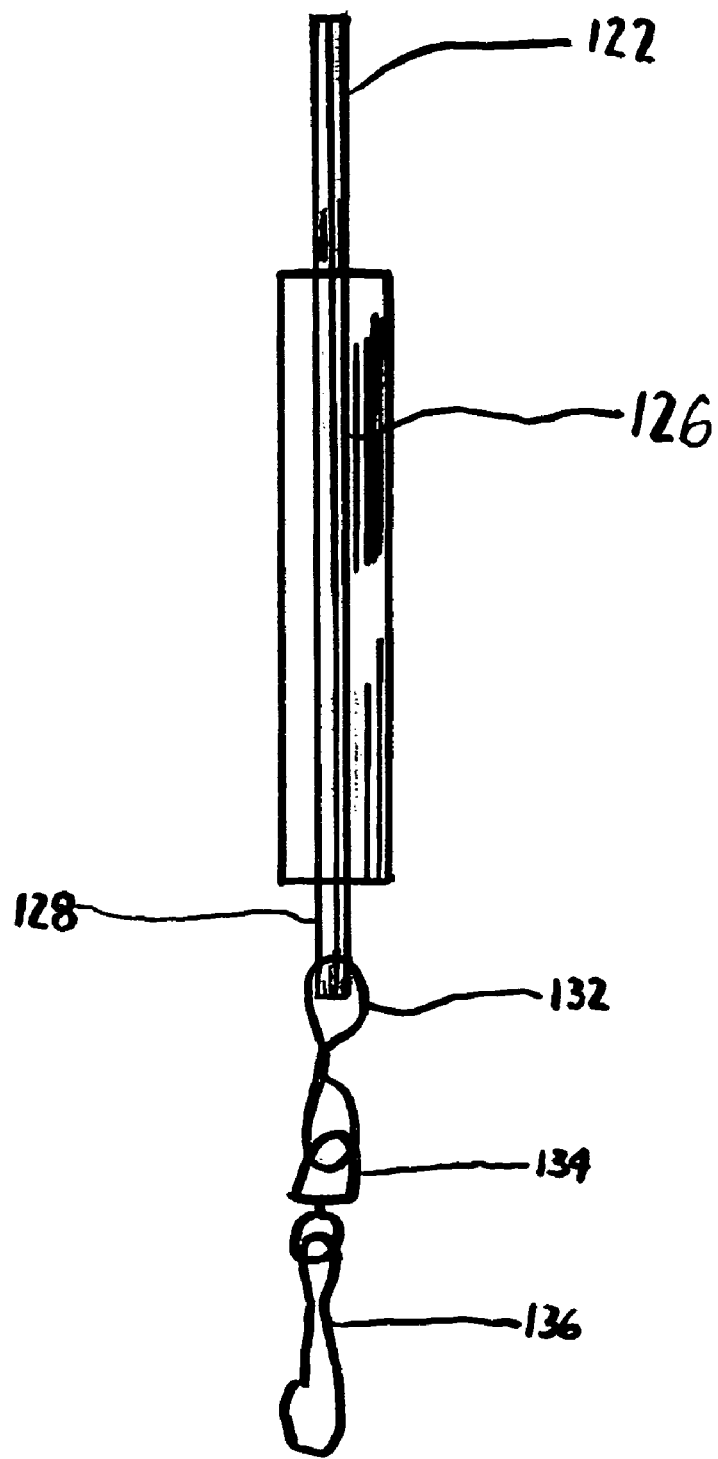
FIG. 3 is a front view of the paint bucket ladder hook with closed grip rectangular style handle.

FIGS. 1, 2 and 3 will illustrate the intended use and operation of the paint bucket ladder hook with rectangular handle. FIG. 1 illustrates the rounded extension ladder rung hook 122. This hook is designed to hang easily and securely to a rung of an extension ladder.

Upper horizontal frame 124 and lower frame 130 are both connected to the closed rectangular grip handle 126, this design gives the painter an easy to grip fast action handle; for maneuvering the can of paint from rung to rung on an extension ladder. Vertical frame 128 connects to lower frame 130 and rounded extension ladder rung hook 122 to complete the frame. The painter can attach a full can of paint to the spring snap hook 136. This will create a one-piece unit for the painter. The painter can now move the can of paint fast and efficiently from rung to rung on an extension ladder in a safe and secure manner.

FIG. 2 illustrates a side view of the rounded extension ladder rung hook 122. Closed rectangular grip handle 126 connects to upper horizontal frame 124 and lower frame 130. S-hook 132 is connected to lower frame 130. Swivel 134 is connected to S-hook 132. Spring snap hook 136 is connected to swivel 134. A full can of paint will be securely attached to the spring snap hook 136 through the paint can wire handle.

FIG. 2 shows broken lines replicating an extension ladder, with the can of paint securely attached onto.

FIG. 2 also shows the can of paint securely attached to the spring snap hook 136. Therefore, giving the painter's a single unit to move quickly and efficiently from rung to rung on an extension ladder.

FIG. 2 also illustrates the closed rectangular grip design handle for hand held gripping; for left or right-handed painters enabling workers to move the can of paint fast and efficiently from rung to rung on an extension ladder.

FIG. 3 illustrates the front view.

DESCRIPTION—ALTERNATIVE EMBODIMENT

There are various alternative embodiments and configurations for the present invention. These alternative embodiments are listed as FIG. 4A through FIG. 4G.

Figure 4G:
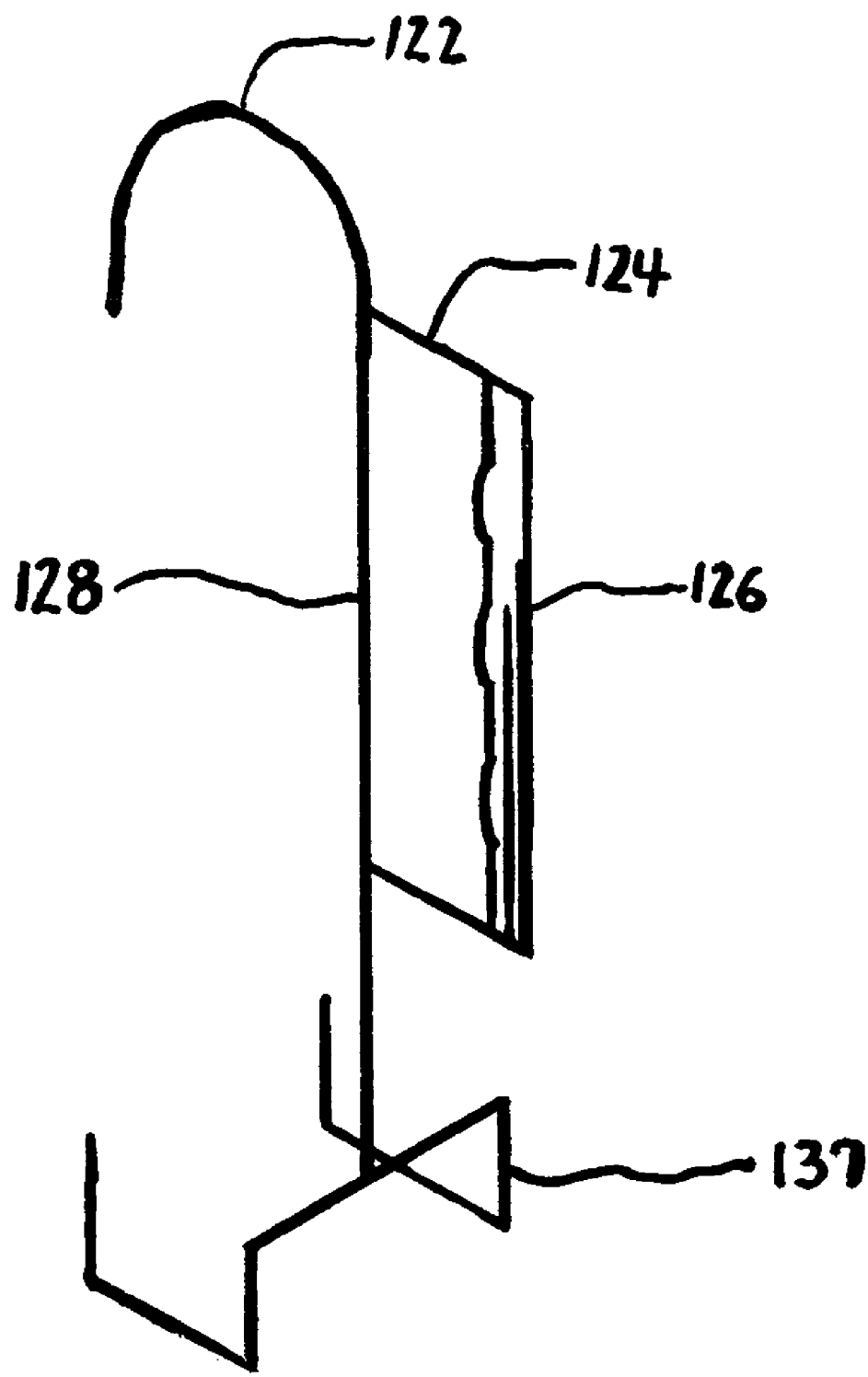

FIG. 4A is a design of a straight vertical shape handle
FIG. 4B shows a bottom mounted grip handle.
FIG. 4C illustrates a top mounted grip handle.
FIG. 4D shows a T-shaped grip handle.
FIG. 4E displays a square rung hook with top mounted handle.
FIG. 4F illustrates a square rung hook, top mounted handle and solid one-piece lower hook.
FIG. 4G shows a closed rectangular grip handle with two hooks forming a cradle to hug the extension ladder rail.

FIG. 4A is a side view of the paint bucket ladder hook with an alternative straight vertical shaped handle. This handle is simple to grasp for right or left-handed painters. This design has great maneuverability from rung to rung on an extension ladder.

FIG. 4B is a side view of the paint bucket ladder hook with an alternative bottom mounted grip handle. This bottom mounted handle is easy to grasp for left or right-handed painters. This design will make it easy for the painter to move the can of paint from rung to rung on an extension ladder.

FIG. 4C is a side view of the paint bucket ladder hook with an alternative top mounted grip handle. This design gives the worker a well balanced grip handle for better productivity moving the can of paint from rung to rung on an extension ladder.

FIG. 4D is a side view of the paint bucket ladder hook with an alternative T-shaped handle. This design is lightweight, easy to use and holds the can of paint securely to the spring snap hook.

FIG. 4E is a side view of the paint bucket ladder hook with an alternative rectangular extension ladder rung hook and a top mounted grip handle. This design makes it safe and fast moving the can of paint up and down the extension ladder rung. Right or left-handed people can grasp the handle very easily. The lower eyelet creates a secure connection for the S-hook, swivel and spring snap hook.

FIG. 4F is a side view of the paint bucket ladder hook with an alternative rectangular extension ladder rung hook with a top mounted grip handle. This design has a solid one-piece lower hook embodied into the vertical frame. This one-piece hook makes a solid mount for the can of paint.

FIG. 4G is an isometric view of the paint bucket ladder hook with alternative dual lower solid frame hooks; for left or right-handed painters. Please note: that these two built in hooks create their own cradle to hug around the left or right rail on an extension ladder. This design has a full rectangular handle grip.

Advantages

From the description above, a number of advantages of our present invention are evident:

(a) The painter can very quickly move the paint bucket ladder hook with the can of paint attached to it as a single unit.
(b) The user can safely transport the paint bucket ladder hook as a single unit to the desired position on an extension ladder with one hand.
(c) As the work progresses the user can very easily and quickly reposition the paint can on either side of an extension ladder; left or right side rail.
(d) As the painting progresses, the painter can move the paint can up or down the rung of the extension ladder in a fast and safe manner.
(e) The user can be a right or left-handed person.
(f) The paint bucket ladder hook is simple and lightweight for ease of use.
(g) The paint bucket ladder hook can be economically manufactured in quantities.
(h) The paint bucket ladder hook makes a workers job faster, safer, easier and increases their paint production by saving time, through its quick grip handle.

Conclusion, Ramifications, and Scope

The present invention is an innovative simple design solution, for attaching a can of paint to an extension ladder. The emphasis of the invention is primarily directed toward addressing the key issues of the painter's productivity, ease of use and safety while painting high up on an extension ladder. The easy to grip handle on our paint bucket ladder hook makes this hook simple and unique. Furthermore, the painter can hold onto the ladder safely with one hand, and move the can of paint with the other hand in a quick and safe manner.

Although the description of the present invention contains specifics of the preferred embodiment, these should not be construed as limiting the scope of the invention. The embodiment described herein is subject to variation in structure, design, and manufacturing methodology. For example, practical variable alternatives are presented herein for a handle grip.

Accordingly, the scope of the invention should be determined by the appended claims and their legal equivalents, and not be limited to the details disclosed herein.

We claim:

1. A paint bucket ladder hook assembly for suspending a paint bucket to a ladder rung comprising a rounded strong metal upper hook for suspending from a ladder rung, a closed grip handle for moving the hook assembly, and a lower hook for supporting a paint bucket;

Wherein the closed grip handle includes an upper horizontal frame having a first end and a second end, a vertical handle frame being a strong solid plastic ribbed handle having an upper end and a lower end, a lower vertical frame integrally formed with the upper hook at lower end of the hook, a lower horizontal frame having a first end and a second end, the first end of the upper horizontal frame is connected to the upper end of the vertical handle frame and the first end of the lower horizontal frame is connected to the lower end of the vertical handle frame; the lower horizontal frame includes a first horizontal portion having an end defining the first end of the lower horizontal frame, and an offset being L-shaped connected to the first horizontal portion and extending below the first horizontal portion, the offset having an end defining the second end of the lower horizontal frame;

the lower vertical frame extending parallel to the vertical handle frame, the lower vertical frame having a lower end connected to the second end of the lower horizontal frame, the lower vertical frame extending upwardly from the second end of the lower horizontal frame to the lower end of the upper hook;

the second end of the upper horizontal frame connected to the lower vertical frame, and the upper hook disposed upwardly from the upper horizontal frame, the lower hook includes a metal link suspended from and movable along the offset of the lower horizontal frame and a swivel attached below the metal link and a spring snap hook attached below the swivel for suspending a paint bucket.

* * * * *